United States Patent [19]

Kato

[11] Patent Number: 4,891,759
[45] Date of Patent: Jan. 2, 1990

[54] CONTROL SYSTEM FOR AUTOMOTIVE AUTOMATIC TRANSMISSION INCLUDING DOWNSHIFT SELECT SHOCK SUPPRESSION ARRANGEMENT

[75] Inventor: Yuji Kato, Yokohama, Japan

[73] Assignee: Nissan Motor Co., Ltd., Yokohama, Japan

[21] Appl. No.: 192,972

[22] Filed: May 12, 1988

[30] Foreign Application Priority Data

May 14, 1987 [JP] Japan .................. 62-118483

[51] Int. Cl.⁴ .................. B60K 41/18; B60K 41/06
[52] U.S. Cl. .................. 364/424.1; 74/866; 74/857
[58] Field of Search .................. 364/424.1, 131, 133, 364/426.01–426.05; 192/0.032, 0.076; 74/866, 857, 336 R

[56] References Cited

U.S. PATENT DOCUMENTS

| | | | |
|---|---|---|---|
| 4,502,354 | 3/1985 | Suzuki et al. | 74/866 |
| 4,539,870 | 9/1985 | Sugano | 74/865 |
| 4,556,955 | 12/1985 | Wright et al. | 364/133 |
| 4,559,599 | 12/1985 | Habu et al. | 364/424.1 |
| 4,593,581 | 6/1986 | Omitsu | 74/866 |
| 4,603,240 | 7/1986 | Hayasaki | 200/61.91 |
| 4,622,866 | 11/1986 | Ito et al. | 364/424.1 |
| 4,644,826 | 2/1987 | Kubo et al. | 74/866 |
| 4,671,139 | 6/1987 | Downs et al. | 364/424.1 |
| 4,680,992 | 7/1987 | Hayasaki et al. | 74/869 |
| 4,691,285 | 9/1987 | Takeda | 364/424.1 |
| 4,698,763 | 10/1987 | Smyth | 364/424.1 |
| 4,730,519 | 3/1988 | Nakamura et al. | 364/424.1 |
| 4,742,732 | 5/1988 | Hiramatsu | 364/424.1 |
| 4,744,031 | 5/1988 | Takeda et al. | 364/424.1 |
| 4,753,134 | 6/1988 | Hayasaki | 364/424.1 |
| 4,770,066 | 9/1988 | Hayasaki et al. | 74/867 |
| 4,771,657 | 9/1988 | Iwatsuki | 364/424.1 |
| 4,796,490 | 1/1989 | Butts et al. | 74/866 |
| 4,819,187 | 4/1989 | Yasue et al. | 364/424.1 |
| 4,825,372 | 4/1989 | Yasue et al. | 364/424.1 |

FOREIGN PATENT DOCUMENTS

58-37357 3/1983 Japan .

Primary Examiner—Parshotam S. Lall
Assistant Examiner—Christopher L. Makay
Attorney, Agent, or Firm—Foley & Lardner, Schwartz, Jeffery, Schwaab, Mack, Blumenthal & Evans

[57] ABSTRACT

When the select lever is shifted from D ranged to one of I or II ranges for the purposes of producing engine braking, the engine speed is momentarily increased to a level whereat the effect of coasting torque which tends to increase the rotational speed of the engine is obviated.

13 Claims, 9 Drawing Sheets

CONTROL SYSTEM FOR AUTOMOTIVE AUTOMATIC TRANSMISSION INCLUDING DOWNSHIFT SELECT SHOCK SUPPRESSION ARRANGEMENT

BACKGROUND OF THE INVENTION

1. Field of the Invention

The present invention relates generally to automatic transmissions for automotive vehicles and more specifically to such a type of transmission which reduces select shock upon a manually induced shift from the D range to the I or II ranges for the purposes of engine braking.

2. Description of the Prior Art

In conventional automatic transmissions, a plurality of clutches and brakes are used to selectively induce one or more planetary gear trains to produce a series of gear ratios. An example of such a gear train is disclosed in JP-A-58-37357.

During operation such a transmission can undergo one of four basic types of shift: a power on upshift, a power on downshift, a power off upshift and a power off downshift. Due to the nature of each type of shift a different friction element engagement timing is required to produce the required shift characteristics.

For example, in the above mentioned JP-A-58-37357 arrangement, two different shift schedules are used in connection with the power on downshifting which take partial changes in torque into account for the purposes of avoiding engine racing and to suppress shift shock.

However, even with the provision of two different control schedules, the above mentioned arrangement has not been able to suppress the effect of so called coasting torque on downshifting in a manner which provides the required operational characteristics.

That is to say, during a power off downshift, due to the momentum of the vehicle, coasting torque tends to flow back through the gear train to the engine. To compensate for this, the two shift schedules are arranged to take the change in torque phase induced by the change in gear ratio produced by the downshift and arbitarily increase the rotational speed of the engine (which tends toward idling speed) to a level which is selected to produce sufficient power as to match the driving effect which tends to be produced by the reverse flowing coasting torque and thus to smooth the shift.

However, in the case that the transmission is induced to downshift in response to a manual shifting of the gear select lever, the smoothing effect provided by the shift control schedules is lost and the vehicle subject to a sudden engine braking effect which induces a powerful vehicular deceleration. This produces a disturbing influence on the vehicle occupants.

One attempt to overcome this problem has taken the form of prolonging the time required to implement the shift. This is based on the concept that the shift shock produced is basically equal to the amount of work which is done (driving the engine) divided by time in which the work is done. Hence, by increasing the time over which the work is done it is thought to be possible to reduce the shock.

However, as the time required to engage and disengage the various friction elements of a transmission is controlled by the movement of a spool valve and the use of hydraulic pressure accumulators, it is in fact very difficult to change the engagement timings to any degree which are, in actual practice, limited to fixed timings. As a result this shift shock attenuating measure has been very difficult to implement.

In addition to the above it has been proposed, in order to improve fuel consumption characteristics, to implement a fuel-cut during deceleration and downshifting, however this measure only serves to increase the amount of "work to be done" and to increase the severity of the shift shock.

Further, increasing the gear ratio of first speed in order to promote good acceleration from standstill tends to increase the rotational speed at which the engine is driven by the above mentioned coasting torque. Accordingly, in order to reduce the shift shock induced by the manual downshifing thought must be given to limiting the gear ratio of first gear. This measure, however, tends to deteriorate the acceleration characteristics of the vehicle.

SUMMARY OF THE INVENTION

It is an object of the present invention to provide a control system which enables the automatic matching of engine output torque and coasting torque during I or II range downshifting as well as during D range in manner which suppresses engine braking induced select shock.

In brief, the above object is achieved by an arrangement wherein when the select lever is shifted from D range to one of I or II ranges for the purposes of producing engine braking, the engine speed is momentarily increased at the time of the resulting downshift to a level at which the effect of coasting torque which tends to increase the rotational speed of the engine is obviated.

More specifically, a first aspect of the present invention comes in the form of a transmission control system for a vehicle having an engine and a transmission which is interposed between the engine and the driven wheels of the vehicle, the control system featuring: a vehicle speed sensor; an engine load sensor; a manually controllable gear select device, the gear select device being movable between a D range and a I range; an engine control device, the engine control device being arranged to control the rotational speed of the engine; a transmission control unit, the transmission control unit being arranged to control the shifting of the transmission: a control circuit, the control circuit being operatively connected with the vehicle speed sensor, the engine load sensor and the gear select device, the control circuit being arranged to produce first and second control signals based on the inputs from the vehicle speed sensor, the engine load sensor and the gear select device, the first control signal being applied to the engine control device and the second control signal being applied to the transmission control unit, the control circuit including means for: modifying the second control signal in a manner which increases the engine rotational speed in a timed relationship with the downshifting induced by the first control signal when the gear select device is moved from the D range position to the I range position for the purposes of inducing an engine braking producing downshift, and when the engine speed is lower than that which will be induced by a reverse flow of torque which passes from the driven wheels through the transmission to the engine.

A second aspect of the present invention comes in the form of a method of controlling the transmission in a vehicle having an engine and wherein the transmission is interposed between the engine and the driven wheels of the vehicle, the method featuring the steps of: sensing vehicle speed; sensing engine load; sensing the position of a manually controllable gear select device which is movable between a D range and a I range; producing first and second control signals based on the vehicle speed and engine load and the position of the gear select device; using the first control signal to control the engine speed; using the second control signal to control the transmission shifting; modifying the second control signal in a manner which increases the engine rotational speed in a timed relationship with the downshifting induced by the first control signal when the gear select device is sensed as having been moved from the D range position to the I range position for the purposes of inducing an engine braking downshift, and when the engine speed is lower than that which will be induced by a reverse flow of torque which passes from the driven wheels through the transmission to the engine.

DETAILED DESCRIPTION OF THE PREFERRED EMBODIMENTS

Figure 1:
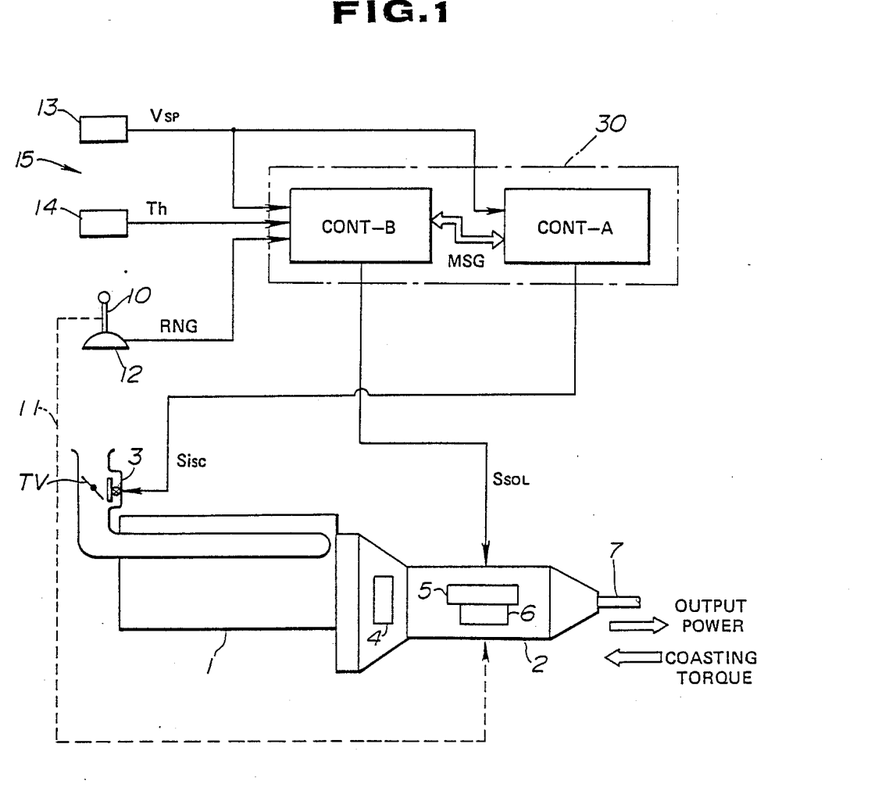
FIG. 1 is a schmatic layout of an engine/transmission system of the type to which the present invention is applied.

FIG. 1 shows a system to which the present invention is applied. In this system, an internal combustion engine 1 which is operatively connected with an automatic transmission 2 by way of a suitable torque converter/lock up clutch arrangement 4. The engine 1 is provided with a throttle valve TV or the like arrangement which controls the amount of air supplied to the cylinders of the engine. This arrangement therefore controls the air-fuel ratio of the air-fuel mixture combusted therein and the amount of torque produced by the engine 1.

The engine 1 further includes an idle speed control (ISC) valve 3 which is disposed in a by-pass passage which leads around the engine throttle valve and which controls the amount of air supplied to the engine cylinders when the engine throttle valve is fully closed. This ISC valve is supplied with a Sisc control signal which varies the cross-sectional area of the by-pass passage avaiable for air to flow through to the engine 1.

The transmission 2 includes a power train 5 which includes, by way of example only, two (or three) planetary gear sets, and a plurality of clutches and brakes which can induce the planetary gear sets to produce a number of forward speeds and at least one reverse gear ratio. The power train 5 is controlled by a hydraulic control unit 6 which includes a plurality of spool valves which control the supply of so called line pressure to the servos of the clutches and brakes in a manner to selectively condition the above mentioned gear train to produce the desired gear ratio.

The movement of the spool valves is controlled by a plurality of solenoid operated valves which selectively open and close drain ports provided in the hydraulic conduiting associated with the spool valves.

In this instance the transmission power train includes a one-way clutch OWC, which, by way of example forms a part of the gear train which supplies torque from the transmission input shaft to the output shaft when the transmission is set in D range and conditioned to produce a first speed.

For the sake of explanation let it be assumed that this transmission is of the type disclosed in U.S. Pat. No. 4,680,992 issued on July 21, 1987 in the name of Hayasaki et al (hereby incorporated by reference thereto) and which is capable of producing four forward speeds and one reverse. A manual selector valve which defines a vital part of the of the hydraulic control unit 6 is operatively connected with a manually operable select lever 10 by way of a mechanical connection 11. This arrangement enables the manual selector valve to be selectively set in positions which condition the transmission to produce one of P, R, N, D, I and II ranges.

When the D range is selected the above mentioned transmission is designed to automatically shift between the forward speed ratios in response to operational parameters such as engine speed and engine load.

On the other hand, when II range is selected the transmission is prevented from shifting above second speed, while when I range is selected the transmission is held in first speed.

However, the transmission is arranged to prevent downshifting into the first speed, irrespective of the select lever being set in I range (to produce strong engine braking for example) until the vehicle speed reduces below a predetermined level (Vb). This is done to prevent transmission and engine damage as a result of excessively high rotational speeds being generated within. That it to say, it is possible for the driver to move the select lever 10 from D range to either one of II or I ranges while the vehicle is moving forward.

Under these conditions if the engine output torque is relatively high and/or is being increased by the opening the engine throttle, the amount of torque supplied to the rear wheels is increased. However, in the event that the engine torque is relatively low, such as in the case the engine throttle valve is closed or near closed, coasting torque tends to be produced and transmitted from the driven wheels of the vehicle back toward the engine. Depending on engine speed, this reverse torque flow tends to drive the engine in a manner which increases the rotational speed thereof.

The system shown in FIG. 1 further includes an inhibitor switch 12, a vehicle speed sensor 13 and throttle position sensor 14. These sensors form a driving condition detection arrangement generally denoted by the numearl 15.

A control circuit 30 is operatively connected with the three sensors and includes therein first and second control units CONT-A and CONT-B. As will be appreciated, while the inhibitor switch 12 is illustrated as being located at the base of the shift lever 10, this device is not limited to this position and can be (and usually is) disposed on the transmission casing. For further information relating to this type of switch, reference can be had to U.S. Pat. No. 4,603,240 issued on July 29, 1986 in the name of Hayasaki.

Both of the above mentioned control units CONT-A and CONT-B contain microprocessors which include a CPU, RAM, ROM, I/O and the like. In this arrangement the vehicle speed signal Vsp produced by the vehicle speed sensor 13 is supplied to the I/O of both of the microprocessors, while the throttle position signal Th produced by the throttle position sensor 14, and the RNG signal indicative of the setting of the select lever 10, are supplied only to the I/0 of the microprocessor included in the CONT-B control unit.

The CONT-A unit is arranged to control the amount or air and/or fuel which is supplied to the engine in response to the inputs applied thereto by issuing a control signal Sisc to the ISC valve. On the other hand, the CONT-B unit is arranged to control the shifting of the transmission in response to the inputs applied thereto by issuing a control signal Ssol which selectively energizes and de-energizes a plurality of solenoids included in the hydraulic control circuit 6.

A control signal MSG is bussed between the two microprocessors. This signal includes a predetermined number of information bits, each bit representing the status of flags which are involved in the processing of the inputted data. By way of example, these flags may take the form of a shift position flag, a select lever position flag, an upshift flag, a downshift flag and a torque increase flag.

The purpose and function of these flags will become more clearly appreciated hereinlater when a discussion is made of the routines shown in the flow charts of FIGS. 3, 10, 11 and 12.

As mentioned in the opening paragraphs of the instant disclosure, in the event it is necessary to suddenly reduce speed, there are two basic modes of control. One is to leave the transmission in D range and simply apply the brakes. In this case, if the driver is skilled and able to heel and toe, it is possible to control the engine speed while applying the vehicle brakes. This enables the avoidance of the otherwise somewhat jerky downshifting. The second method is to intentionally move the select lever from D range to one of I and II ranges while applying the brakes. This is done in order to induce engine braking (normally absent in D range) in addition to the braking effect provided by the application of the vehicle brakes. However, in this case the downshifting is not made in accordance with the engine speed—the vehicle speed shift schedule according to which the D range shifting is conducted—and, as such, a very marked shift shock is produced. This deteriorates the shift feeling imparted to the vehicle occupants and further places an undesirably large stress on the gear train.

The present invention strives to overcome this problem by reducing the coasting torque which is transmitted back through the gear train and which is applied to the motor in a manner which drives the same.

Figure 2:
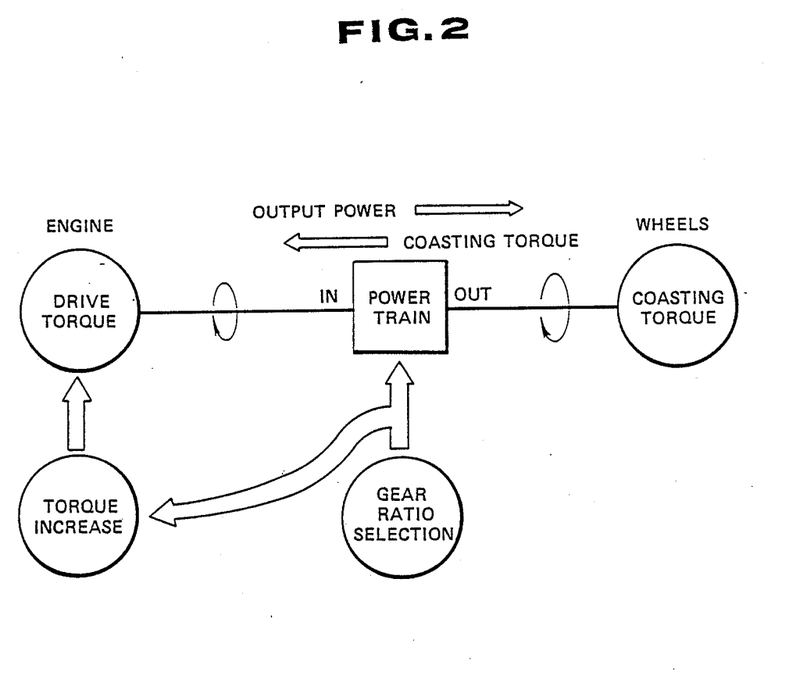
FIG. 2 is a diagram showing the torque flow and functional operations which are performed in accordance with the instant invention.

FIG. 2 shows in schematic form, the relationship which exists between the torque produced by the engine and the above mentioned coasting torque. When the output power of the engine is large, the manually induced downshift results in a power increase at the driven wheels and the acceleration of the vehicle.

However, when the engine output power is lower and coasting torque is larger than the same - viz., IN is larger than OUT, and the selected gear ratio is such as to cause an increase in the engine rotational speed, the increase in RPM absorbs the reverse flowing coasting torque and the vehicle speed tends to be reduced. Viz., engine braking is induced and tends to induce a marked vehicular deceleration and select shock. The present invention modifies this effect by increasing the amount of torque produced by the engine in a timed relationship with the selection of the I or II range.

That is to say, by taking into account the engine speed, the vehicle speed and the gear ratio produced as a result of the downshift, it is possible to achieve a smooth the downshift in a manner which enables the required engine braking but which eliminates the undesirable select shock.

Figure 3:
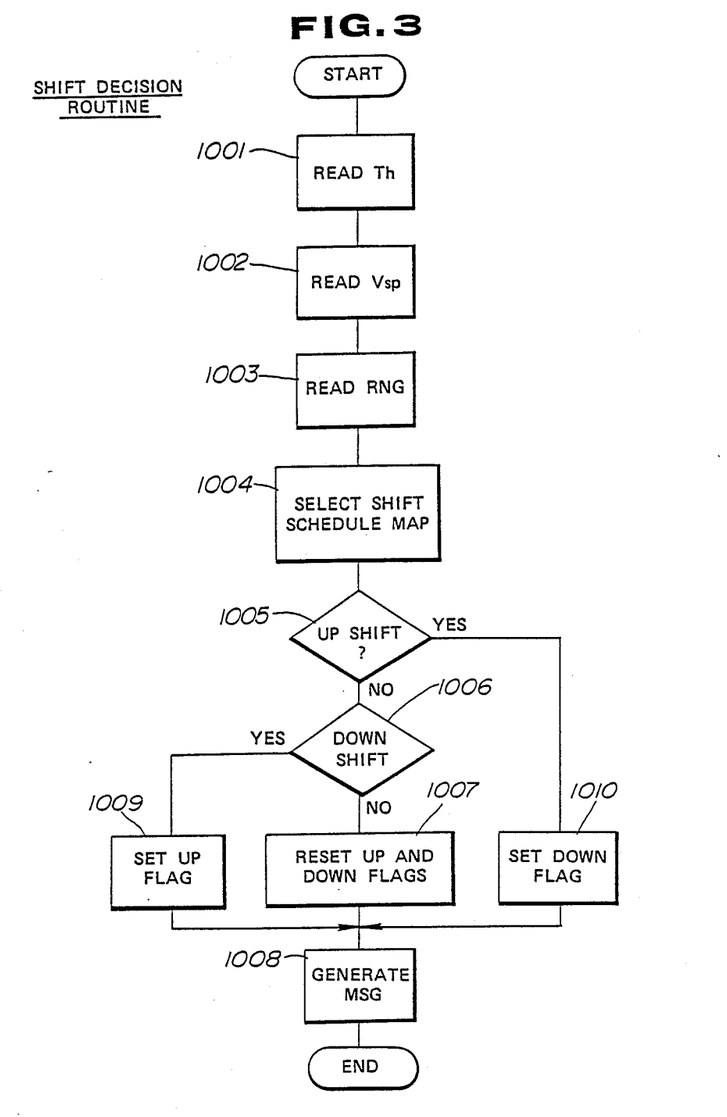
FIG. 3 is a flow chart showing the steps which characterize a shift decision routine which forms a vital part of an embodiment of the instant invention.

FIG. 3 is a flow chart which shows the steps executed in accordance with an embodiment of the invention. The program which implements the shift decision routine shown in this figure is recorded in the ROM of the microprocessor included in the CONT-B unit.

As shown, the first three steps of this shift decision routine are such as to read and record the outputs of the inhibitor switch 12, engine speed sensor 13, and the throttle position sensor 14. At step 1004 a shift schedule map, which is recorded in terms of throttle position and engine speed, is selected of the basis of the data recorded in steps 1001–1003. By way of example, if the select lever 10 is Set in D range, one of the maps shown in FIGS. 4 to 7 are selected on the basis of the gear ratio the transmission is instantly conditioned to produce.

Figure 4:
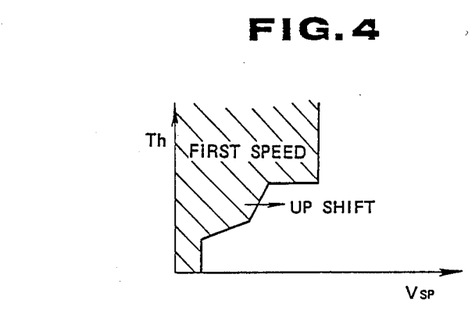
FIGS. 4 to 9 are diagrams which show shift schedules utilized in connection with the instant embodiment.
Figure 5:
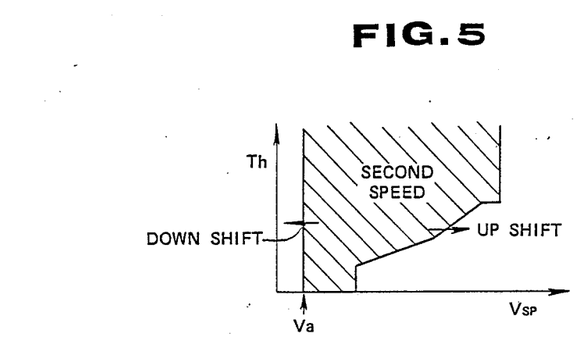
Figure 6:
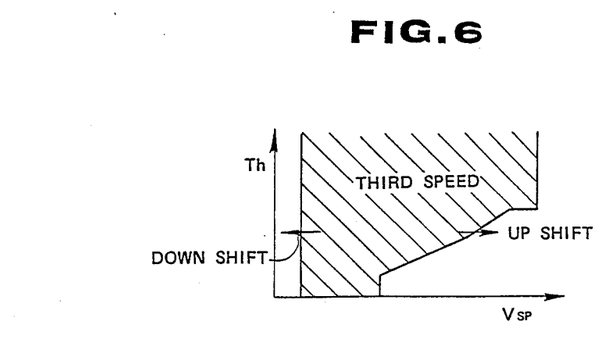
Figure 7:
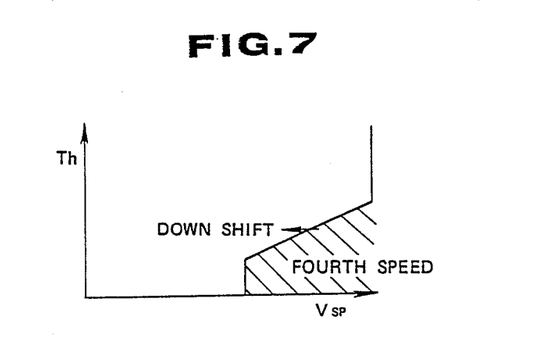

Viz., if the transmission is in first gear then the map shown in FIG. 4 is selected.

Figure 8:
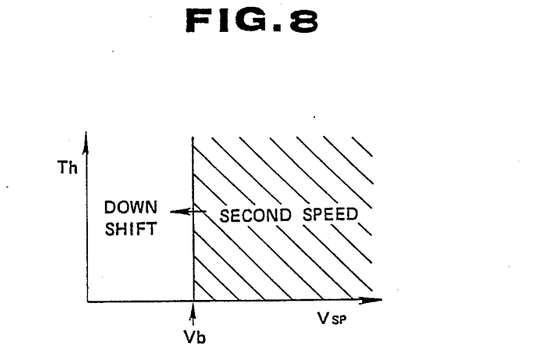
Figure 9:
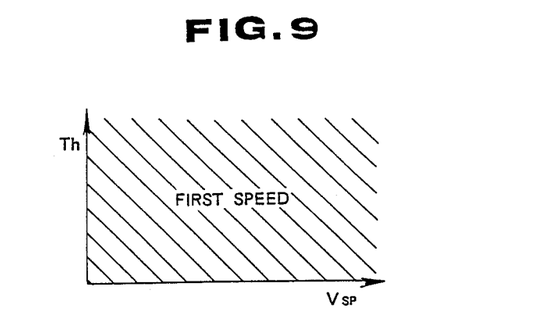

On the other hand, if the shift lever is not set in D range and has been moved to I range for example, the maps shown in FIGS. 8 and 9 are selected.

In the event that the vehicle speed is above Vb for example, the control maps shown in FIG. 8 is such as to inhibit a downshift until such time as the vehicle speed lowers to said value. Following this a forced downshift occurs. Subsequently, the map shown in FIG. 9 is selected and the transmission is held in first gear or speed in accordance with the control provided the latter mentioned map.

By way of contrast, it will be noted that while the transmission is conditioned for D range operation, the shift from second to first gear will occur at a predetermined speed indicated by Va (see FIG. 5) while in the case of I range the shift will occur at Vb (see FIG. 8). By way of example, let it be assumed that Va=20 km/h and Vb=40 km/h. Thus, as will be appreciated when a manual downshift is induced, the downshift will occur at a much higher vehicle speed than in the case of D range control.

At steps 1005 and 1006 the instant values of vehicle speed Vsp and throttle opening Th are used to determine if the co-ordinate defined by the same falls in an upshift zone (step 1005) of the map selected in step 1004 or a downshift zone (step 1006). In the event that it is indicated that the vehicle speed/throttle opening co-ordinate is located in the upshift zone of the currently selected map, the program flows to step 1010 wherein a DOWN flag is set. In the case that step 1006 indicates that the co-ordinate or shift point falls in a downshift zone the program goes to step 1009 and induces the setting of an UP flag.

The UP and DOWN flags represent the next most likely shift that will take place and, thus, when set, place the system on standby for such operations. Viz., while the shift point defined by the instant engine load and vehicle speed falls in the upshift zone of a map, as the only other zone on the map is a downshift zone the only possible shift which can occur for the selected map is a downshift and vice versa.

On the other hand, in the event that the outcome of step 1006 is negative, indicating that the shift point falls on the shift line which divides the upshift and downshift zones and will accordingly permit the downshift to occur without the generation of a shift shock, the program flows to step 1007 wherein a command to reset both the UP and DOWN flags is issued.

At step 1008 depending on the path via which the program has flown from step 1004, a MSG signal is generated in a manner to represent the instant flag status and bussed to the other microprocessor.

Figure 10:
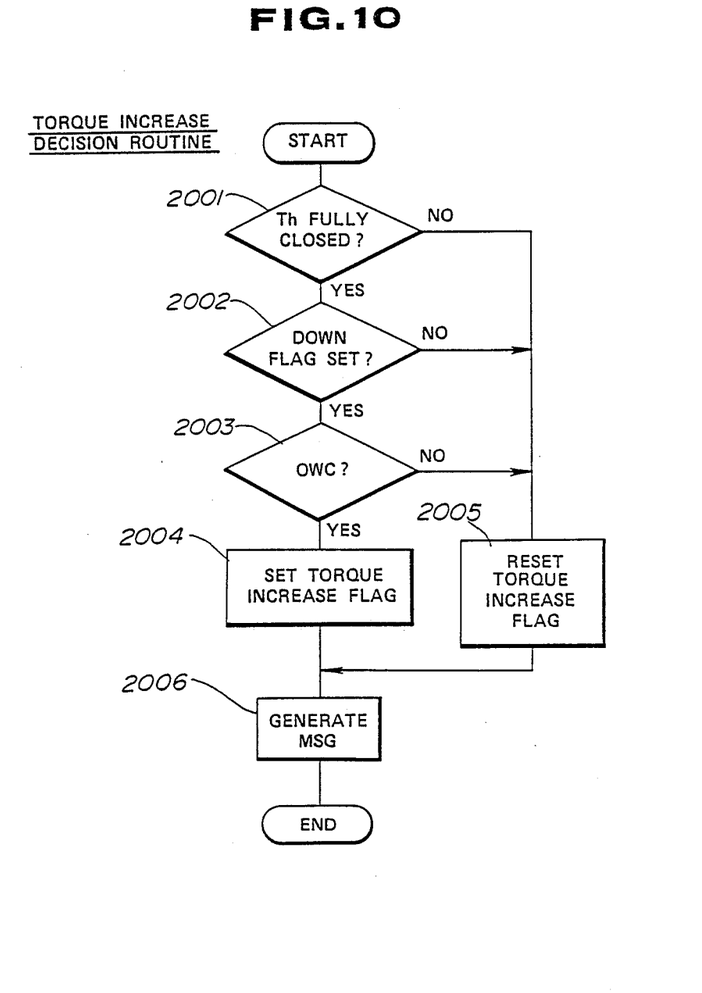
FIG. 10 is a flow chart showing the steps which characterize a torque increase decision routine.

FIG. 10 shows a torque increase decision routine which is recorded in the ROM of the microprocessor of CONT-B. The first step of this routine is such as to read the output Th of the throttle valve position sensor 14 and to determine if the throttle valve has closed or is essentially closed. In the event that the throttle valve signal Th is such as to indicate that the throttle valve is open beyond a degree which indicates a fully closed status, the program flows to step 2005 wherein a TORQUE UP flag is reset. On the other hand, if the outcome of step 2001 is such as to indicate a positive result indicating that the throttle valve is fully closed and assumed an idle status, the program flows to step 2002 wherein the instant status of the DOWN flag checked. In the event that the flag is not set the program flows to step 2005.

However, if the flag has been set the program then flows on to step 2003. In this step, the transmission condition that is produced by a downshift, is examined and the determination made as to whether the power flow is such as to pass through the above mentioned OWC (one-way clutch) or not. In this instance when the power flow passes through the one-way clutch OWC, the transmission input and output shafts are interconnected in a manner to define a single power transmission path.

When the transmission is conditioned for D range, and the transmission shifts into first gear, the transmission gear elements are conditioned in a manner that torque is not transmitted through the one-way clutch OWC and shift shock cannot be generated by the passage of torque therethrough. On the other hand, when the transmission is conditioned to produce I range and is in first gear, torque is transmitted via the OWC and as such shift shock can be produced.

Accordingly, in the event that the transmission is condition so that torque will pass through the OWC, the program flows to step 2004 to set the TORQUE INCREASE flag and the proceeds to step 2006 to generate the appropriate MSG bus signal and supply the same to the CONT-A unit.

However, if the outcome of step 2003 is such as to indicate that the OWC clutch will not be involved in the torque flow path following a downshift, the program flows to step 2005 and from there to step 2006.

Figure 11:
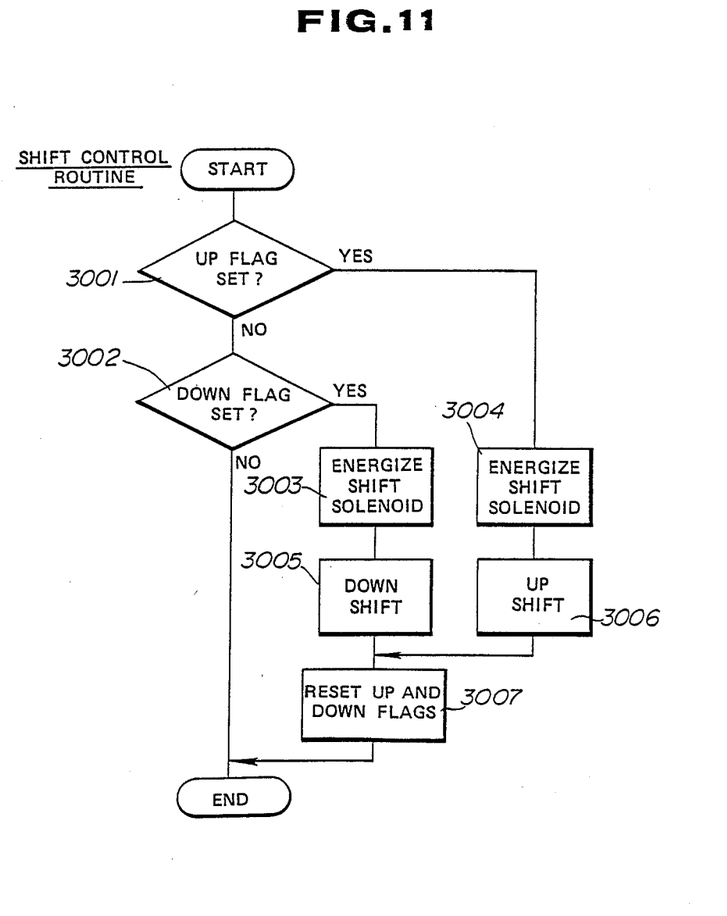
FIG. 11 is a flow chart showing the steps which characterize shift control routine.

FIG. 11 shows a shift control routine which is run following the running of the routines shown in FIGS. 3 and 10. The first step of this routine is such as to determine the instant status of the UP flag. If this flag is set then at step 3004 a command to energize the appropriate solenoid within the hydraulic control unit 6 is generated and in step 3006 the energization is effected. Following this the program flows to step 3007 and resets the UP and DOWN flags.

On the other hand, if the UP flag is not set the program flows from step 3001 to step 3002 wherein the status of the DOWN flag is checked. If this flag is not set then the program ends.

However, in the event that the DOWN flag has been set, then at steps 3003 and 3005 the appropriate solenoid energization is derived and implemented.

Figure 12:
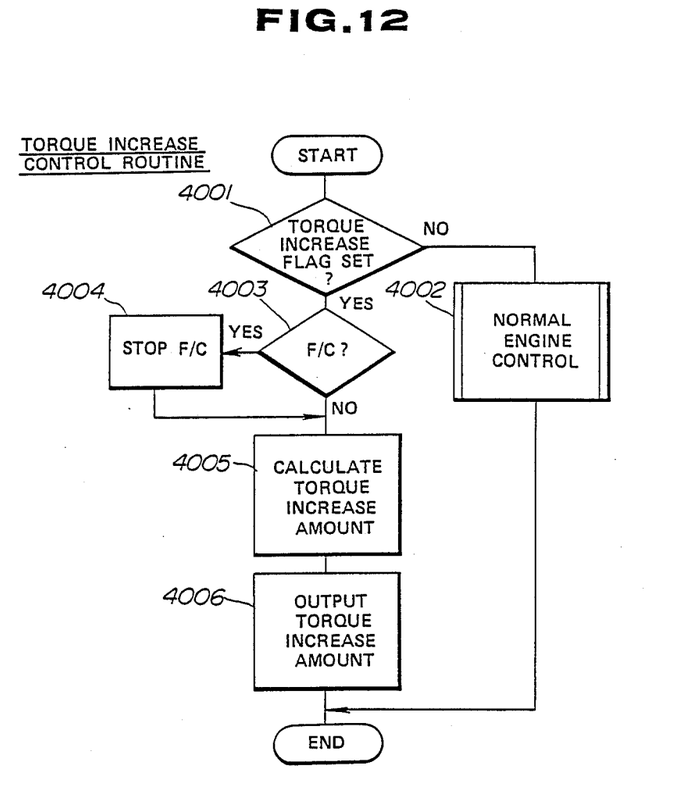
FIG. 12 is a flow chart showing the steps which characterize a torque increase control routine.

FIG. 12 shows a flow chart which depicts the steps which characterize a torque increase control routine which defines a vital part of the instant invention.

The first step of this routine is such as to check the instant status of the TORQUE INCREASE flag as it appears in the MSG bus signal. In the event that this flag is not set then the program flows to step 4002 wherein normal engine control (e.g. engine idling control) is implemented.

On the other hand, in the event that the TORQUE INCREASE flag is set, the program flows to step 4003 wherein it is determined if a fuel-cut operation F/C has been put into effect by the CONT-A unit. In the event that the outcome of this enquiry is such as to indicate that CONT-A is currently stopping the supply of fuel to the engine under the control of a fuel-cut schedule, at step 4004 a command is issued to CONT-B to interrupt the fuel-cut and restore the supply of fuel to the engine.

On the other hand, if no fuel-cut is detected in step 4003 then at step 4005 the amount of torque by which engine output must be increased is calculated.

This calculation is performed using the instant values of vehicle speed Vsp and the gear ratio i which will be produced upon a downshift being implemented in order to derive a target engine speed Nx. In step 4006 this information is transferred to the CONT-A unit which derives the appropriate Sisc signal and applies this to the ISC valve open the same to a degree will induce the required engine speed (Nx).

The above mentioned engine speed increase increases the engine torque output to a level whereat the reverse flowing coasting torque is balanced and neutralized in a manner which reduces the shift shock producd by a downshift.

Figure 13:
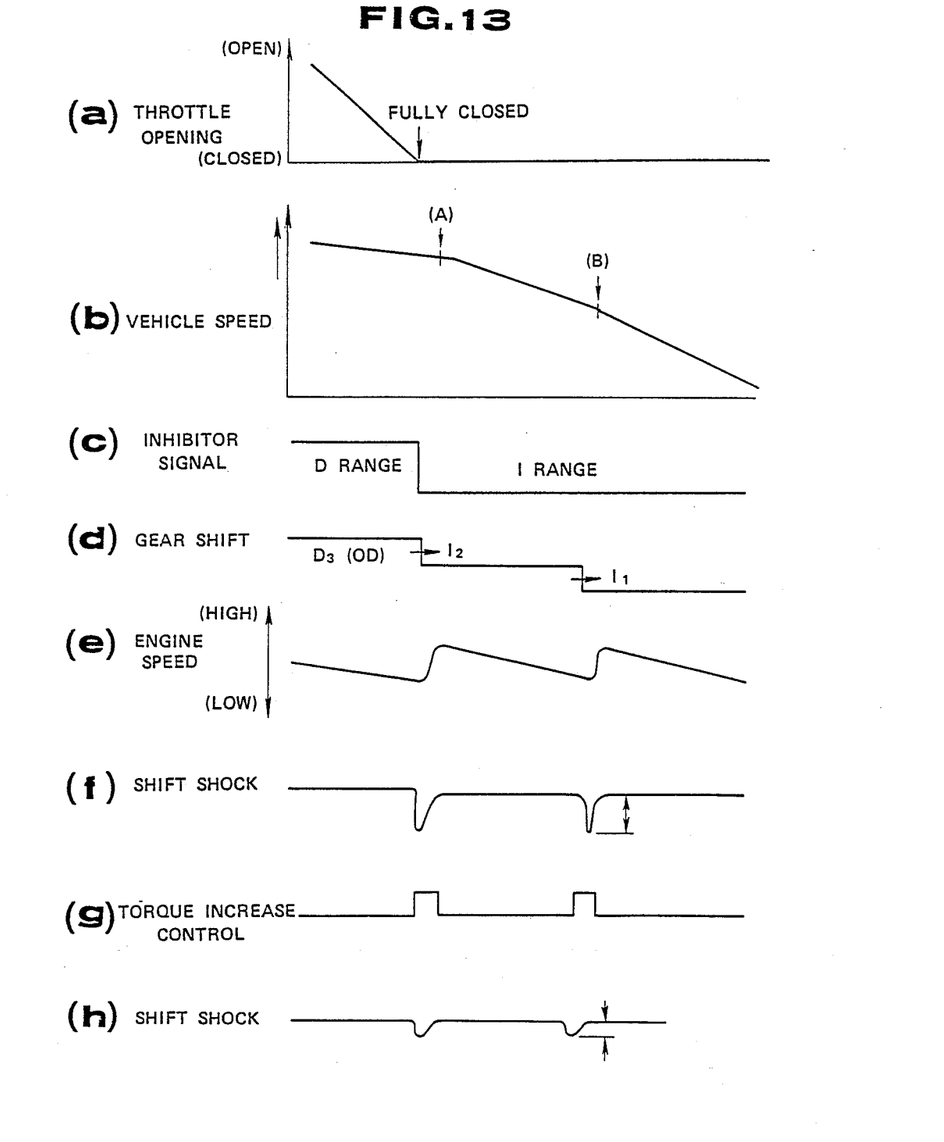
FIG. 13 is a timing chart which shows the operational characteristics provided by the embodiment of the present invention and the improvement in shock control, which is possible with the instant embodiment of the present invention.

This above mentioned feature is illustrated in the timing chart shown in FIG. 13. In this chart the closure of the throttle valve is depicted in FIG. 13(a). The manually induced movement of the shift lever 10 and resulting output of the inhibitor switch 12 is shown in FIG. 13(c). Trace (f) shows the generation of shift shock which tends accompanies the shifting of gears (see trace (d)) and the change in vehicle speed (see trace (b)). Trace (f) shows the generation of a torque increase signal which increases the engine speed in manner which offsets the shift shock and which reduces the shock to discernable but comfortable levels as shown in trace (h).

It will be noted that in trace (b) the points (A) and (B) denote the timing at which shift decisions are issued.

It should be further noted that the present invention is not limited to the control of a by-pass passage and fuel supply as per the preceeding disclosure and can be extended to include complementary ignition timing control and or other controls as deemed appropriate.

What is claimed is:

1. A transmission control system for a vehicle having an engine and a transmission which is operatively interposed between the engine and the driven wheels of the vehicle, comprising:
   a vehicle speed sensor;
   an engine load sensor;
   a manually controllable gear select device, said gear select device being selectively movable between a D range position and an I range position;
   an engine control device, said engine control device being arranged to control the rotational speed of said engine;
   a transmission control unit, said transmission control unit being arranged to control the shifting of the transmission;
   an engine control circuit, said engine control circuit being operatively connected to said vehicle speed sensor, said engine load sensor and said gear select device, said engine control circuit being arranged to product first and second control signals based on the inputs from said vehicle speed sensor, said engine load sensor and said gear select device, said first control signal being applied to said transmission control unit;
   said control unit including means for:
   modifying said second control signal in a manner which increases the engine rotational speed in a timed relationship with the downshifting induced by the first control signal when the gear select device is moved from said D range position toward said I range position for inducing an engine braking producing downshift, and when the engine speed is lower than that which will be induced by the reverse flow of torque which passes from the driven wheels through the transmission to the engine.

2. A transmission control system as claimed in claim 1 wherein said control circuit includes first and second microprocessors, said first microprocessor being arranged to control the engine speed and torque generation when the engine throttle valve is closed and the engine tends to idling speed, said second microprocessor being arranged to control the shifting of the transmission, said first and second microprocessors being operatively interconnected in a manner wherein data can be transmitted therebetween.

3. A transmission control system as claimed in claim 1 wherein said control circuit further includes means for detecting a fuel cut operation being implemented during vehicle deceleration and for selectively interrupting the fuel cut when said second control signal is modified.

4. A transmission control system as claimed in claim 1 wherein said control circuit includes a plurality of pre-memorized control schedules, each of said plurality of control schedules having an upshift zone and a downshift zone, said control circuit using a first preselected one of said control schedules when said gear shift device is moved from said D range to said I range and implementing a downshift according to said first preselected control schedule, and using a second preselected control schedule after the downshift has been implemented.

5. A transmission control system as claimed in claim 1 wherein said engine control device comprises:
   a by-pass passage which leads around the engine throttle valve and through which air can pass when the engine throttle valve is closed; and
   a valve disposed in said by-pass passage for controlling the cross-sectional area of the passage.

6. A transmission control system as claimed in claim 1 wherein said transmission control unit comprises a plurality of spool valves, the positions of which are controlled by solenoid valves, said solenoid valves being operatively connected to said control circuit wherein they are controlled by said second control signal.

7. A method of controlling a transmission in a vehicle having an engine and wherein the transmission is interposed between the engine and the driven wheels of the vehicle,
   sensing vehicle speed;
   sensing engine load;
   sensing the position of a manually controllable gear select device which is movable between a D range and an I range;
   producing first and second control signals based on vehicle speed, engine load and the position of said gear select device;
   using the first control signal to control engine speed;
   using the second control signal to control transmission shifting;
   modifying said second control signal in a manner which increases the engine rotational speed in a timed relationship with the downshifting induced by the first control signal when
   the gear select device is sensed as having been moved from said D range position to said I range position for the purposes of inducing an engine braking downshift, and when
   the engine speed is lower than that which will be induced by a reverse flow of torque which passes from the driven wheels through the transmission to the engine.

8. The method as claimed in claim 7 further comprising the steps of:
   using first and second microprocessors, said first microprocessor being arranged to control the engine speed and torque generation when the engine throttle valve is closed and the engine is permitted to tend to idling speed, said second microprocessor being arranged to control the shifting of the transmission, said first and second microcrpocessors being operatively interconnected in a manner wherein data can be transmitted therebetween.

9. The method as claimed in claim 7 further comprising the steps of:
   detecting a fuel reducing operation being implemented during vehicle deceleration; and
   selectively interrupting the fuel reducing operation when said second control signal is modified.

10. A method as claimed in claim 7 further comprising the steps of:
    storing a plurality of pre-memorized control schedules, each of said plurality of control schedules having an upshift zone and a downshift zone;
    using a first preselected one of said control schedules when said gear shift device is moved from said D range to said I range and implementing a downshift according to said first preselected control schedule, and
    using a second preselected control schedule after the downshift has been implemented.

11. A method as claimed in claim 7 further comprising the steps of:
    by-passing the engine throttle valve using a bypass passage and permitting air to flow to the engine when the engine throttle valve is closed; and controlling the cross-sectional area of the bypassage through which air flow by means of a valve disposed therein.

12. The method as claimed in claim 7 further comprising the steps of:
controlling said transmission using a plurality of spool valves;
controlling the positions of the spool valves using solenoid valves; and
controlling said solenoid valves with said second control signal.

13. In a vehicle
an engine;
a transmission which is operatively interposed between said engine and the driven wheels of the vehicle,
a vehicle speed sensor;
an engine load sensor;
a transmission control unit, said transmission control unit being responsive to said vehicle speed sensor and said engine load sensor and arranged to control the shifting of the gears of said transmission;
a manually controllable gear select device, said gear select device being operatively connected with said transmission control unit and selectively movable between a first position wherein the transmission is conditioned to automatically shift between gears in response to the outputs of said vehicle speed sensor and said engine load sensor, and a second position wherein the transmission is conditioned so that shifting between gears is limited;
an engine control device, said engine control device being arranged to control the air/fuel ratio of the air-fuel mixture supplied to said engine;
an engine control circuit, said control circuit being operatively connected with said vehicle speed sensor, said engine load sensor and said gear select device, and said engine control circuit being arranged to produce a first control signal based on the inputs from said vehicle speed sensor, said engine load sensor and said gear select device, said first control signal being applied to said transmission control unit, said control unit including:
means for varying the operation of said engine control device in a manner which modifies the air-fuel mixture fed to said engine and increases the torque produced by the engine, in a timed relationship with the downshifting induced by said first control signal when the gear select device is moved from said first position to said second position for the purposes of inducing a downshift which produces engine braking, and when the engine speed is lower than that which will be induced by the reverse flow of torque which passes from the driven wheels through the transmission to the engine.

* * * * *